Aug. 16, 1966 H. J. CICHANOWICZ ETAL 3,267,269
PARALLEL ADDER-SUBTRACTER WITH RIPPLE CARRY
Filed March 5, 1963
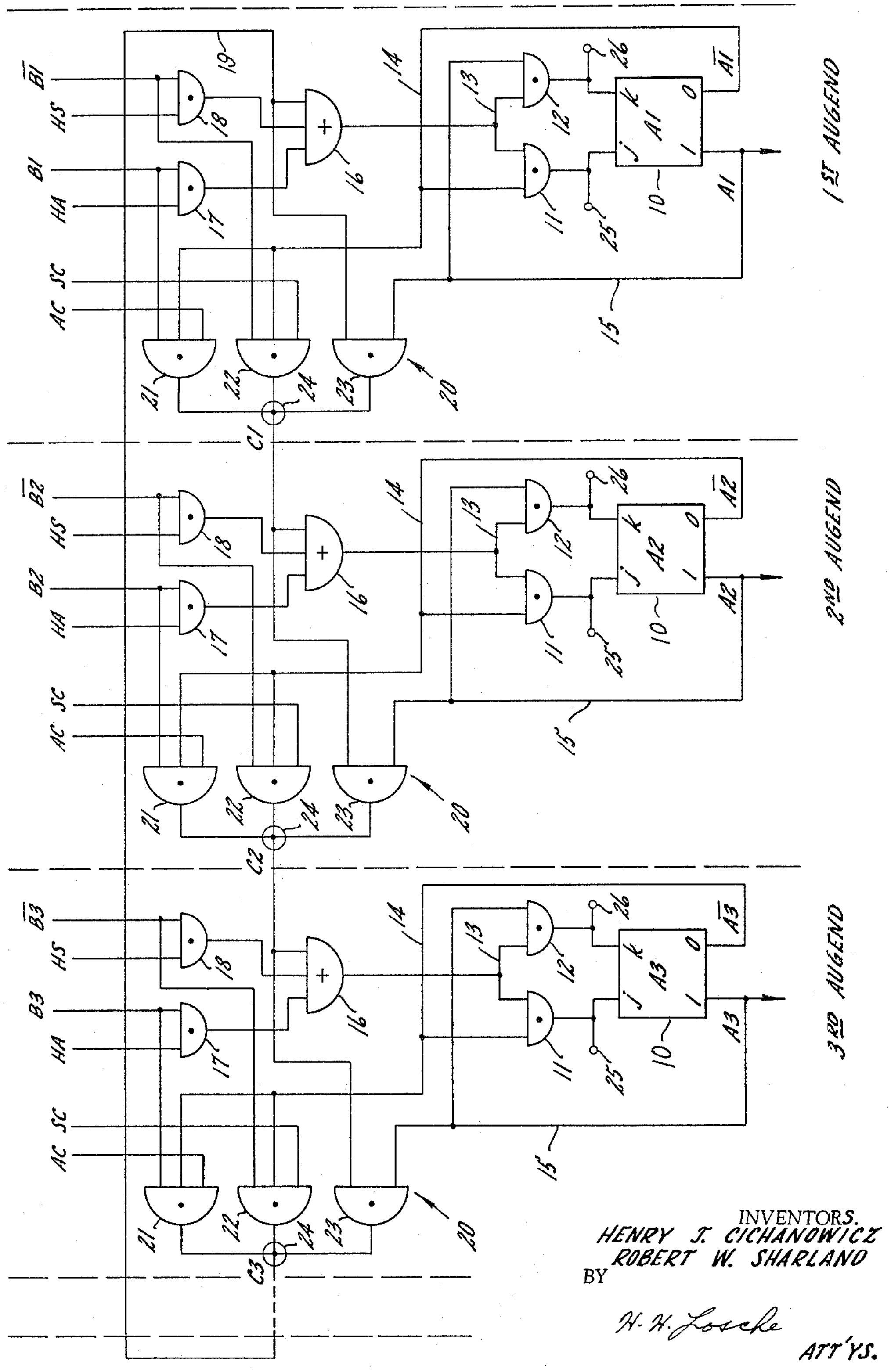
INVENTORS.
HENRY J. CICHANOWICZ
ROBERT W. SHARLAND
BY
H. H. Losche
ATT'YS.

United States Patent Office 3,267,269 Patented August 16, 1966

3,267,269

PARALLEL ADDER-SUBTRACTER WITH RIPPLE CARRY

Henry J. Cichanowicz, Galion, Ohio, and Robert W. Sharland, Baltimore, Md., assignors, by mesne assignments, to the United States of America as represented by the Secretary of the Navy Filed Mar. 5, 1963, Ser. No. 263,086
5 Claims. (Cl. 235—175)

This invention relates to a binary adder and subtracter circuit and more particularly to a parallel binary adder-subtracter circuit with a carry circuit incorporated therein which requires only bistable multivibrators, "and" gates, "or" gates, and "and/or" gate combination to produce high speed ripple carry functions to provide rapid addition and subtraction of binary numbers.

In computer circuits of the parallel binary adder-subtracter type the addend register is coupled in parallel to the augend register such that binary numbers placed in the addend register can be added to, or subtracted from, the binary number in the augend register to produce binary numerical results corresponding to the correct results in decimal numbers. If subtraction is to be performed, the addend register will take the subtrahend and the augend register will hold the minuend. When any augend stage advances to the limit for its digit, as where the stage output goes from the "1" state back to the "0" state, a carry is produced and a carry gating means is usually provided to carry the digit to the next higher digital stage. This process of addition and subtraction requires a great number of circuit components and the carry operation is quite time consuming since carry digits must propagate from the lowest order digit toward the higher order digits, sampling and changing digits along the way until the digit bit arrives at the correct digital number in the augend register.

In the present invention a plurality of augend binary stages are coupled in a digital bit sequence to produce an augend register with inputs thereto adapted to be supplied by the addend register of the computer. Each augend stage includes a bistable multivibrator, two pairs of "and" gates, an "or" gate, and an "and/or"gate combination, referred to herein as "anor" gate. An "and/or" gate or "anor" gate, as used herein, is a combination of a plurality of "and" gates coupled to a single "or" gate, as disclosed in the text Digital Computer Design Fundamentals by Yaohan Chu, 1962, published by the McGraw-Hill Book Company, Incorporated, page 101. The two pairs of "and" gates are coupled through the "or" gate from the addend register input to the bistable multivibrator. The outputs of the bistable multivibrator are cross coupled to the inputs of the "and" gates supplying the inputs to the bistable multivibrator. The "anor" gate in a stage is coupled to the output of the bistable multivibrator and to the input of the "and" gate of that stage receiving addend register signals to determine whether a carry digital signal is to be passed on to higher order digital stages. The carry circuits of the augend digital stages are serially coupled so that any carry binary digit will "ripple" through each higher order digital stage that has the "anor" gate in the "go" condition in which the "1" state of that stage is also present on one of the "and" gates in the "anor" gate to which "and" gate the carry digital signal is to be applied. This places the "anor" gate in the "go" condition for a carry digital signal that may be applied. This stage will likewise be changed from its "1" state to its "0" state. A carry signal can be produced by either the presence of a preceding carry and the presence of a "1" state output from the multivibrator output or by the presence of a "0" state signal from the multivibrator output and the proper addend register input along with the clock pulse. The output of the last "anor" carry circuit is coupled as an input to the first digital stage and the first "anor" carry circuit so that, if the last stage contains a carry digit, it will have an end around carry too the first augend stage. It is therefore a general object of this invention to provide an augend register of a parallel binary adder-subtracter counter with a carry circuit for each augend stage coupled to produce ripple carry whereby the augend components are kept to a minimum and computing operations are exceedingly rapid.

These and other objects and the attendant advantages, features and uses will become more apparent to those skilled in the art as the description proceeds when considered along with the accompanying figure of drawing illustrating the invention in block circuit schematic form.

Referring more particularly to the figure of drawing, there is shown a block schematic diagram of three augend stages of an augend register for a parallel binary adder-subtracter circuit. The first augend register stage is shown to the right with the second and third augend stages to the left, in that order, to place the augend register stages in the normal digital position of the binary number sequence. Three augend register stages are shown to provide an illustrated example of the invention although as many augend stages may be used as desired or necessary to produce an augend register of sufficient columns to adapt the device for the necessary binary adder-subtracter computations. Since the augend register stages are identical in construction and arrangement, only the first augend register will be described in detail with such reference to other augend register stages as is necessary to describe construction of the whole augend (A) register.

Referring particularly to the first augend register stage to the right in the drawing there is shown in block 10 a bistable multivibrator circuit having two inputs *j* and *k* and two outputs "1" and "0." Whenever a *j* input is applied to the bistable multivibrator circuit, herein referred to as the A1 register, a "1" state will appear at the output of the A1 stage and will be referred to hereinafter as the A1 output. Whenever a *k* signal input is applied to the A1 register, the bistable multivibrator 10 will assume the "0" state which will hereinafter be referred to as the $\overline{A1}$ output. The *j* input to the A1 register is from the output of an "and" gate 11 while the *k* input to the A1 register is the output from an "and" gate 12. The "and" gates 11 and 12, represented by a dot, each have two inputs, one each of these inputs being coupled in common by a conductor means 13. The second input of the "and" gate 11 is cross coupled by conductor means 14 to the $\overline{A1}$ output of the bistable multivibrator 10 which is a signal output when the bistable multivibrator 10 is in the "0" state. The second input to the "and" gate 12 is cross coupled by way of conductor means 15 to the A1 output of the bistable multivibrator 10 which is a signal output produced when the bistable multivibrator 10 is in the "1" state. The common input 13 to the "and" gates 11 and 12 is from an "or" gate 16 identified by the + sign therein. The "or" gate has three inputs, one input from an "and" gate 17, a second input from an "and" gate 18, and a third input from the carry circuit of a preceding stage by way of conductor means 19, which carry circuit will be more fully described hereinbelow. The "and" gates 17 and 18 each have two inputs. The "and" gate 17 has an input designated as B1 which is adapted to be connected to the addend (B) register of the parallel adder-subtracter binary circuit, this B1 input constituting the "1" state output of the addend or B register. The second input to the "and" gate 17 is a clock pulse produced for half-add operation and designated by HA. The "and" gate 18 has one input from the addend or B register adapted to be coupled by the conductor designated as $\overline{B1}$ which is a signal from the B register in the "0" state. The second input to the "and" gate 18 is a clock pulse for half-subtract operation, herein designated by HS. In the process of addition, whenever a B1 signal (or a "1" state signal from the B or addend register) is applied to the "and" gate 17 along with a half-add clock pulse HA, the output signal is conducted through the "or" gate 16 as one input to both "and" gates 11 and 12. Whichever "and" gate 11 or 12 has an accompanying $\overline{A1}$ or A1 signal thereon, respectively, will pass the signal on to either the *j* or *k* input, respectively, of the bistable multivibrator 10 to establish either the "1" state or the "0" state on the output hereof.

A carry circuit is included in the above described first augend register circuit and consists of an "anor" gate 20 which includes three "and" gates 21, 22, and 23, with the outputs thereof coupled in common to a common output at the circle designation 24 which produces the "or" function of the "anor" circuit. This common output is designated by C1. The "and" gates 21 and 22 each have three inputs thereto while the "and" gate 23 has two inputs thereto. The first input to "and" gate 21 is the B1 signal from the addend or B register, the second input is the $\overline{A1}$ output from the bistable multivibrator 10, and the third input is the clock pulse providing an add control signal, herein designated by the reference characters AC. The "and" gate 22 has one input provided by the $\overline{B1}$ signal from the B or addend register, a second input from the $\overline{A1}$ output of the bistable multivibrator 10, and a third input from a subtracter control clock pulse source, herein designated by the reference characters SC. The "and" gate 23 has one input coupled to the output carry conductor 19 of a preceding stage and a second input coupled to the A1 output of the bistable multivibrator 10.

The several augend register stages are coupled one to another through the carry circuit 20 output; for example, the output C1 of carry circuit 20 in the first augend stage is coupled to the second augend stage. In like manner, the output of the carry circuit of the second augend is coupled by C2 to the third augend stage and the output C3 of the third augend stage is coupled to succeeding augend stages where such are necessary and designated in the drawing by the broken C3 conductor. Since only three augend stages are illustrated herein for the purpose of example, the output C3 is connected in an "end around" relation by conductor 19 as an input to the "or" gate 16 and one input to the "and" gate 23 of the carry circuit 20 in the first augend register. Whatever number of augend stages are used in the augend register, the output of the final carry circuit will be connected in an "end around" circuit 19 as shown for the three stages herein. Where it is convenient to manually insert a binary digital number into the augend register, this may be accomplished by circulating pulses to either of the terminals 25 or 26 as it is desired to place various augend stages in the "1" state or "0" state to produce the A1 or $\overline{A1}$ outputs, respectively, for problem solution. Binary digital numbers will be produced on the the A1 outputs of the A register A1, A2, A3 . . . A*n* to produce the results of addition or subtraction on indicator means, as lights or other types of indications, as are well understood by those skilled in the computer art. Whatever number of augend stages are used to suit the circumstances or application of the computer, the last augend stage is used to designate whether the number is positive or negative. It is accordingly convenient, in the illustration of three augend stages shown herein, to designate the number with a period between the second and third digital numbers such as 0.00. When numbers are in binary form with all possible numbers represented, these binary numbers will be designated straight forwardly; but when negative binary numbers are represented, these will be represented by the ones complement of their binary magnitude; as for example, the positive decimal number 2 will be represented in binary form as 0.10 but in negative form the decimal number 2 will be represented as 1.01.

OPERATION

In the operation of the augend register showing three augend stages, for example herein, let it be assumed in the first example that it is desirous to add +2 to +1. For simplicity these examples will be set down in a tabular form in the following manner:

*Example 1 (addition)*

| Operation | Register | Binary Number | Decimal Number |
|---|---|---|---|
| | A | 0.10 | +2 |
| | B | 0.01 | +1 |
| HA | A | 0.11 | |
| AC | A | 0.11 | |
| End Around | A | 0.11 | +3 |

In this example, the A or augend register is resting in the 0.10 state representative of decimal number 2. A B1 signal, coming from the addend register and amounting to the "1" state output of the B register, is applied to "and" gate 17. When a half-add signal HA is applied to "and" gate 17, an output signal is produced through "or" gate 16 to the common input 13 of "and" gates 11 and 12. Since the A1 register is in the "0" state and therefore has an $\overline{A1}$ output, "and" gate 11 will pass the pulse as a *j* input to the bistable multivibrator 10 tripping this multivibrator to the "1" state or the A1 output. Since the B2 and B3 inputs from the addend C register are both zeroes, the second and third augend registers will remain in their "1" and "0" states so that the augend register now rests in the 0.11 state. The add control signal AC will now be applied to the "and" gate 21 of the "anor" circuit 20, which has a B1 signal and the AC signal applied thereto, but the $\overline{A1}$ signal being absent no output will be produced at C1 for this stage. Likewise, there will be no output from either C2 or C3 since the B2 and B3 signals are absent in the second and third augend stages. Therefore, there will be no "end around" signal over the conductor 19 and the augend register will remain in its 0.11 state giving the decimal answer of +3. It is to be noted that when B1, B2, or B3 signals are applied for addition, only the AC pulse is applied and any $\overline{B1}$, $\overline{B2}$, or $\overline{B3}$ signals are ineffective. Likewise, only $\overline{B1}$, $\overline{B2}$, or $\overline{B3}$ signals become effective with SC clock pulses.

*Example 2 (subtraction)*

| Operation | Register | Binary Number | Decimal Number |
|---|---|---|---|
| | A | 0.10 | +2 |
| | B | 0.01 | +1 |
| HS | A | 1.00 | |
| CS | A | 0.00 | |
| End Around | A | 0.01 | +1 |

Example 2 shows the augend or A register in the 0.10 state. Subtraction is performed by changing the sign of the subtrahend and proceeding as in addition. Since $\overline{B1}$ is in the "1" state, no signal is applied to "and" gate 18 and A1 will remain in its present "0" state or $\overline{A1}$ output state. $\overline{B2}$, on the other hand, is in the "0" state and will operate to change A2 to the "0" state when the clock pulse HS is applied to the "and" gate 18 in the second augend stage. In like manner, $\overline{B3}$ being in the "0" state will cause A3 to go to the "1" state. This places the A register in the 1.00 state. When the clock subtract control pulse SC is applied to "and" gate 22 of the first augend stage, no C1 output is obtained since $\overline{B1}$ is in the "1" state. A carry signal C2 will be produced since $\overline{B2}$ is present, $\overline{A2}$ is present, and SC is present. The C2 signal trips A3 to produce the $\overline{A3}$ output or "0" state signal and since "and" gate 23 of the third augend stage had the A3 output and the C2 signal thereon, the C3 carry signal is produced in "end around" conduction to change the A1 register to produce the A1 ouput or "1" state. This places the A register in the state 0.01 providing the decimal answer of +1.

*Example 3 (subtraction)*

| Operation | Register | Binary Number | Decimal Number |
|---|---|---|---|
| | A | 0.10 | +2 |
| | B | 1.10 | −1 |
| HS | A | 0.11 | |
| CS | A | 0.11 | |
| End Around | A | 0.11 | +3 |

Example 3 can be followed in operation the same as Example 2. Here no carries C1, C2, or C3 were produced to change the A register after the HS signals were applied to the three stages.

*Example 4 (addition)*

| Operation | Register | Binary Number | Decimal Number |
|---|---|---|---|
| | A | 1.10 | −1 |
| | B | 0.11 | +3 |
| HA | A | 1.01 | |
| AC | A | 0.01 | |
| End Around | A | 0.10 | +2 |

In Example 4 the B1 and B2 signals will change the $\overline{A1}$ and A2 outputs of the augend register to the A1 and $\overline{A2}$ outputs. There being no B3 signal, A3 will remain unchanged. When the AC clock pulse is applied, A1 output will remain unchanged since there is no $\overline{A1}$ input to the "and" gate 21. A C2 carry signal will be developed since AC, B2, and $\overline{A2}$ signals are applied to "and" gate 21 of the second augend stage. C2 causes A3 to trip to the $\overline{A3}$ output at the same time that C3 is developed by the C2 and A3 signals on the "and" gate 23 of the third augend stage. This is a "ripple" carry which is applied in the end around circuit to A1 to change A1 output to $\overline{A1}$ output. Likewise, the C3 carry signal applied to the "and" gate 23 of the first augend stage along with A1 output causes A2 to change from the $\overline{A2}$ output to the A2 output. Since A2 was in the "0" state, the carry C3 (becoming C1) was unable to ripple through to produce another C2 carry signal. The A register therefore results in the binary number 0.10 representative of the decimal number +2, the answer.

*Example 5 (subtraction)*

| Operation | Register | Binary Number | Decimal Number |
|---|---|---|---|
| | A | 1.00 | −3 |
| | B | 1.10 | −1 |
| HS | A | 1.01 | |
| SC | A | 1.01 | |
| End Around | A | 1.01 | −2 |

*Example 6 (addition)*

| Operation | Register | Binary Number | Decimal Number |
|---|---|---|---|
| | A | 0.11 | +3 |
| | B | 1.10 | −1 |
| HA | A | 1.01 | |
| AC | A | 0.01 | |
| End Around | A | 0.10 | +2 |

The steps are also given for Examples 5 and 6 in which it may be noted that no carries were developed in Example 5. In Example 6, when the AC clock pulse is applied, a carry signal C2 is developed to trip the A3 output to an $\overline{A3}$ output. Since A3 was in the "1" state, the carry C2 will ripple through to produce C3 which in turn trips A1 from its "1" state to its "0" state. At the same time, since A1 was in the "1" state, C3 ripples through to produce C1 which changes the state of A2 from the "0" state to the "1" state. No C2 carry is produced since A2 was in its "0" state at the time C1 was applied to "and" gate 23 of the second augend stage. The answer results in the binary number 0.10, being +2 decimal number.

The above described construction and description of operation points up the rapid operation possible by this ripple through carry circuitry. Components are held to a minimum which further accomplishes the end results of rapid computation. Where a 1 megacycle clock rate is used, addition and subtraction can be accomplished in two microseconds even though additional augend stages are used.

While many modifications and changes may be made in the constructional details and features of this invention to meet certain demands and capabilities without departing from the spirit and scope of the invention, we desire to be limited only by the scope of the appended claims.

We claim:

1. A parallel adder-subtracter binary circuit of a plurality of augend register stages with ripple carry means, each stage comprising:

a bistable multivibrator having two inputs and two outputs, each input having a two input "and" gate coupled thereto, the two outputs of said multivibrator being cross coupled to one input of the two input "and" gates;

a pair of input "and" gates each having two inputs and one output, the outputs being coupled to a first "or" gate, the output of which "or" gate is coupled in common to the other inputs of the two "and" gate inputs to said bistable multivibrator, and one input of each input "and" gate adapted to receive binary signals from an addend register; and a carry circuit including three carry "and" gates, two carry "and" gates of which have three inputs and one output and one carry "and" gate of which has two inputs and one output, the outputs being coupled in common to produce a carry "or" function, said two carry "and" gates each having a first input coupled with said one input of each input "and" gate and a second input of each coupled in common to one bistable multivibrator output, the third input of said two carry "and" gates adapted to be coupled to clock control pulses, and said third carry "and" gate of said carry circuit having one input coupled to the other bistable multivibrator output and the other input coupled to the carry circuit output of the preceding augend stage in common with a third input to said first "or" gate, the carry circuit input to the first augend stage being from the carry circuit output of the last augend stage whereby ripple carry through the augend stages is accomplished with the addition and subtraction of binary numbers.

2. A parallel adder-subtracter binary circuit of a plurality of augend register stages with ripple carry means, each stage comprising:

a bistable multivibrator having two inputs and two outputs;

first and second pairs of "and" gates, each "and" gate of each pair having first and second inputs and one output, with the first pair having its first inputs adapted to receive binary signals from an addend register, its second inputs adapted to receive clock pulses, and the two outputs of said second pair of "and" gates coupled, respectively, to the two inputs of said bistable multivibrator;

a first "or" gate having three inputs and one output, two of said inputs coupling, respectively, the outputs of said first pair of "and" gates and said output coupling in common the first inputs of said second pair of "and" gates; and a carry circuit being an "anor" gate including three carry "and" gates, two carry "and" gates of which have three inputs and an output and one carry "and" gate of which has two inputs and one output, said outputs being coupled in common and functioning as a carry "or" gate to complete the "anor" gate, one input of each of said two carry "and" gates being coupled to said first inputs of said first pair of "and" gates, another input of said two carry "and" gates being coupled to clock pulse sources, and the third input of said two carry "and" gates being coupled in common to one output of said bistable multivibrator and one of the second inputs of said second pair of "and" gates, and the third carry "and" gate having one input coupled in common with the third input of said first "or" gate and the output of the carry circuit in the preceding augend stage and the other input coupled to the other output of said bistable multivibrator and the other of the second inputs of said second pair of "and" gates, the first augend stage receiving the carry circuit output of the last augend stage whereby addition and subtraction of binary numbers are accomplished with rapid ripple carry through the augend stages.

3. A parallel adder-subtracter binary circuit as set forth in claim 2 wherein said clock pulse inputs to said second inputs of said first pair of "and" gates are respectively half-add and half-subtract clock pulse signals.

4. A parallel adder-subtracter binary circuit as set forth in claim 3 wherein said other inputs to said two carry circuit "and" gates are add control clock pulses for one carry "and" gate conditioned for performing addition, and subtract control clock pulses for the other "and" gate conditioned for performing subtraction.

5. A parallel adder-subtracter binary circuit as set forth in claim 4 wherein said two outputs of said bistable multivibrator are of the "1" state and the "0" state, and said third input to said two carry "and" gates of said carry circuit coupled in common to one output of said bistable multivibrator is from said "0" state, and said other input to said third carry "and" gate of said carry circuit coupled to the other output of said bistable multivibrator is from said "1" state output.

References Cited by the Examiner

UNITED STATES PATENTS

| | | | |
|---|---|---|---|
| 2,879,001 | 3/1959 | Weinberger | 235—175 |
| 3,125,675 | 3/1964 | Jeeves | 235—175 |
| 3,198,939 | 8/1965 | Heilbig | 235—175 |

MALCOLM A. MORRISON, *Primary Examiner.*

T. M. ZIMMER, K. MILDE, *Assistant Examiners.*